March 4, 1924.
H. S. HANDLER
WHEEL
Filed May 8, 1922     2 Sheets-Sheet 1
1,485,916
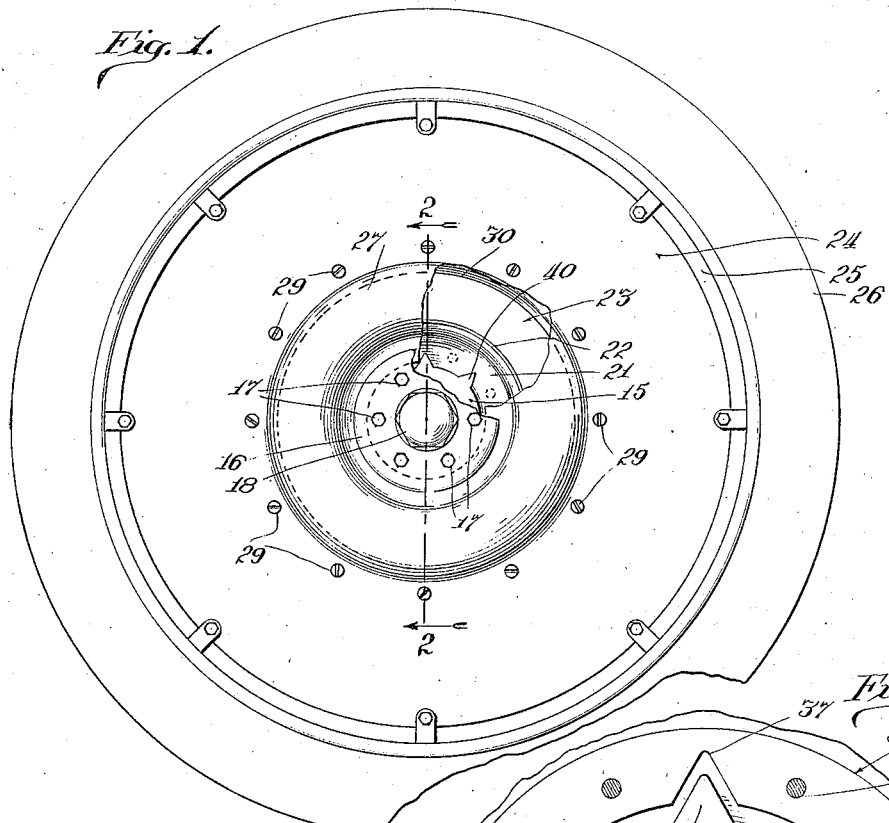
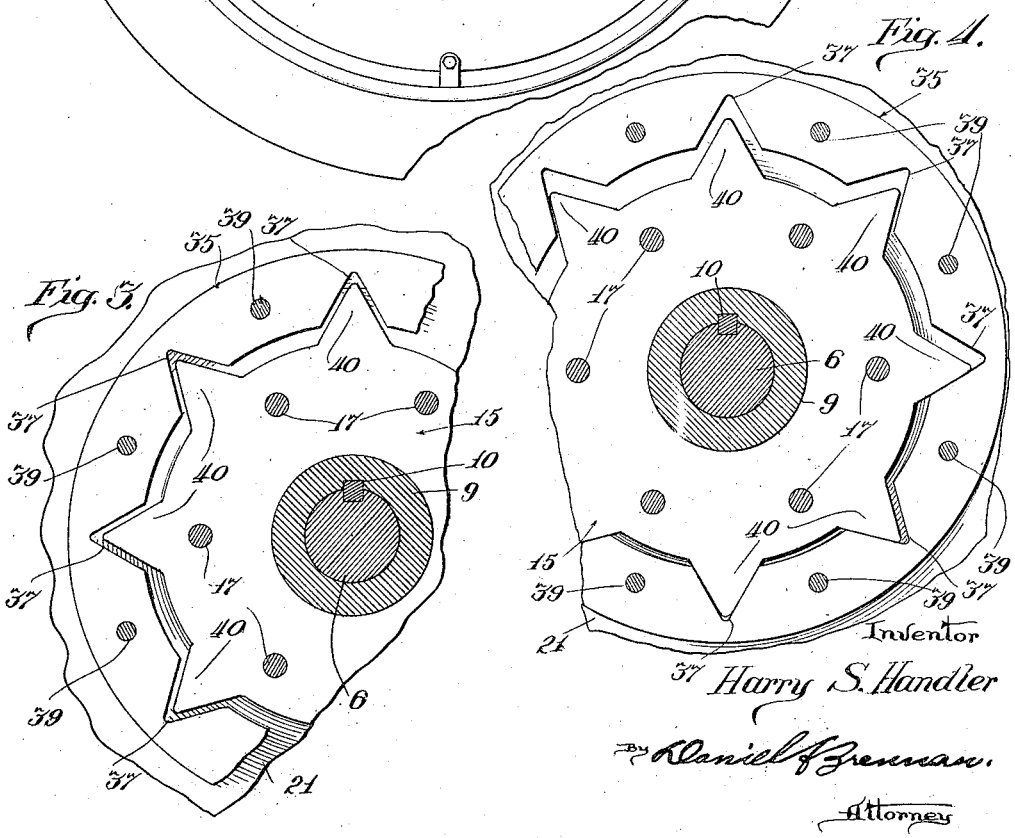
Inventor
Harry S. Handler
By Daniel F. Brennan
Attorney

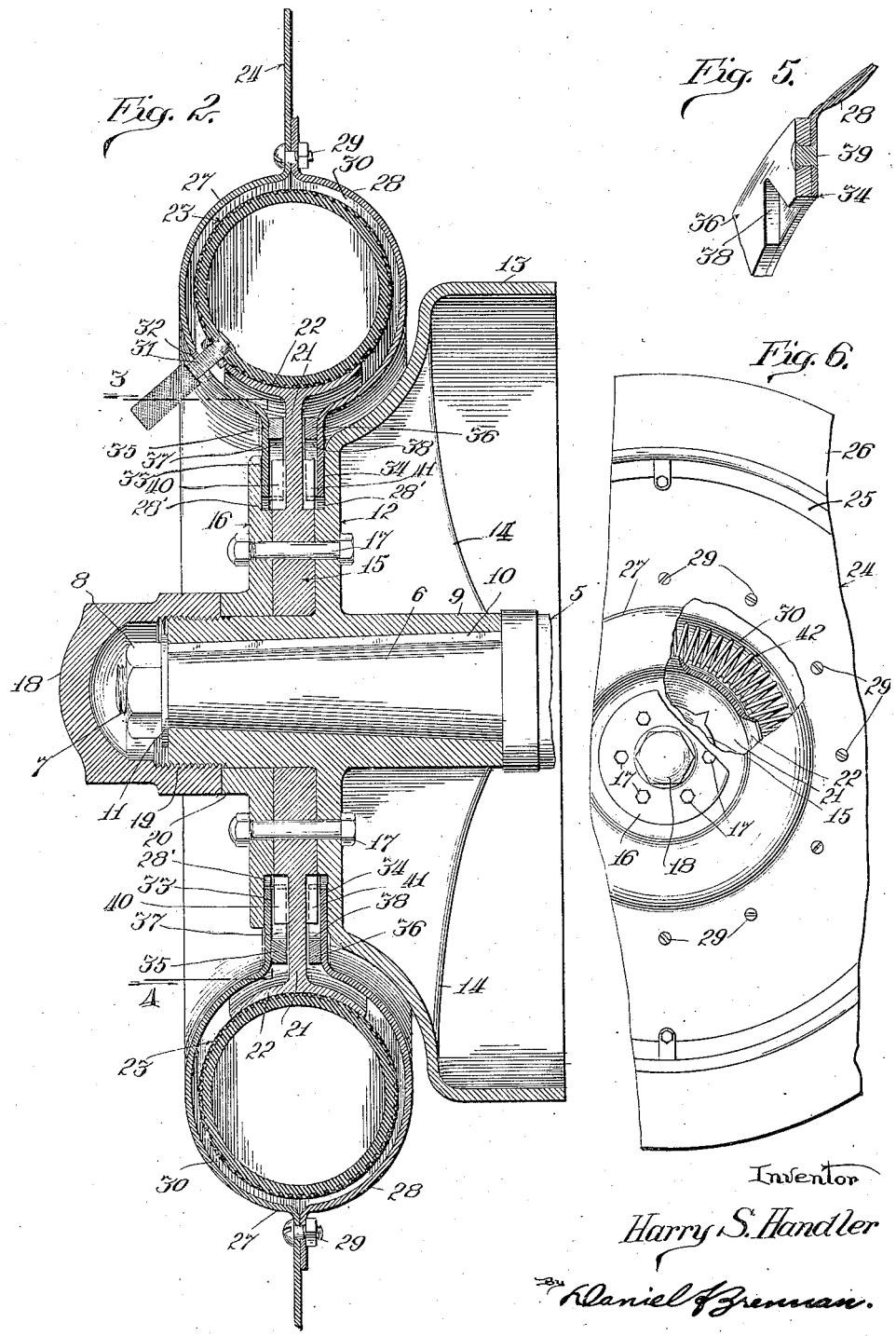

Patented Mar. 4, 1924.

1,485,916

UNITED STATES PATENT OFFICE.

HARRY S. HANDLER, OF CHICAGO, ILLINOIS.

WHEEL.

Application filed May 8, 1922. Serial No. 559,301.

*To all whom it may concern:*

Be it known that I, HARRY S. HANDLER, a citizen of the United States, residing at Chicago, county of Cook, and State of Illinois, have invented new and useful Improvements in Wheels, of which the following is a specification.

This invention relates to resilient wheels, and more particularly to wheels characterized by the provision of rigid hub and felloe and yieldingly resistant means between the hub and felloe.

The principal objects and advantages characteristic of this invention find attainment in the provision of a generally improved resilient wheel structure to the accomplishment of simplicity, durability, and efficiency in operation; the provision of improved means for mounting a yieldingly resistant element in a wheel; the provision of improved means for imparting motion from the driving to the driven element in a resilient wheel; the provision of an improved arrangement of the yieldingly resistant element and driving means in a resilient wheel; and the provision of a device of the character described capable of embodiment in a standard automobile disk wheel.

The foregoing and such objects and advantages as may be pointed out or appear as this description proceeds are attained in the structural embodiment illustrated in the accompanying drawings in which:

Figure 1 is a side elevational view of a resilient wheel embodying the improvements of this invention.

Figure 2 is a fragmentary enlarged transverse sectional view taken on line 2—2 of Fig. 1, looking in the direction of the arrows.

Figures 3 and 4 are sectional views on line 3—4 of Fig. 2, looking in the direction indicated by the arrows, and illustrating the wheel parts in different positions.

Figure 5 is a fragmentary perspective view of a detail.

Figure 6 is a fragmentary elevational view of a modified form of this invention.

Referring more particularly to the drawings, 5 is an axle having a tapering spindle 6 extending from an end thereof, said spindle having a threaded extremity 7 for receiving a nut 8. In the embodiment illustrated the driving axle of a motor vehicle is shown and the hub sleeve 9 is therefore fixedly connected to the spindle 6 by a key 10, the nut 8 having an annular flange 11 for retaining the hub, the latter being provided with a tapering bore and a keyway for accommodation snugly of said spindle and key.

The hub sleeve 9 is provided with an integral radial annular flange 12, which latter has integrally formed thereon the brake drum 13, webs 14 serving to strengthen said drum. The flange 12 supports an annular driving plate 15, which latter is receivable upon the hub sleeve, and abuts said flange 12, a retaining annulus 16 also being receivable on said hub sleeve and engaging the outer surface of the driving plate 15, a circumferential series of bolts 17 passing through flange 12, plate 15 and annulus 16 for rigidly connecting said elements. A hub cap 18 is threaded at 19 onto the sleeve 9 and abuts an annular foot 20 formed on the retaining plate 16. The driving plate 15 is provided with a reduced annular web 21 having integrally formed therewith an annular shoe 22, which shoe is arcuate in cross section and forms a seat for the yieldingly resistant cushioning element, here shown as an inflated pneumatic casing 23.

The wheel body may comprise a disk 24 of sheet metal peripherally bordered by a felloe 25 and tire 26. The disk 24 is, at its inner peripheral margin formed into an annular arcuate section 27, and a similarly shaped section 28 is bolted or otherwise secured at 29 to the disk 24, thus forming a chamber or rigid housing 30 for the pneumatic casing 23, which latter when inflated peripherally abuts the housing 30 and thus yieldingly resistantly suspends or supports the wheel on the shoe 22. The pneumatic casing is inflated by a valve 31, which projects through a slot 32 in the arcuate section 27.

The driving connection comprises a pair of annular radial flanges 33 and 34 formed on the sections 27 and 28, respectively, fitting in annular recesses 28', each of said flanges carrying one each of the flat rings 35 and 36, said rings having each a plurality of inwardly directed notches 37 and 38, said notches being substantially V-shaped. The rings 35 and 36 are fixedly secured to the inner surfaces of the flanges 33 and 34 by rivets 39. As best seen in Fig. 2, the rings 35 and 36 lie on either side of the annular web 21 and said web is provided on both sides with series 40 and 41 of radial substantially V-shaped shoulders which shoulders seat in the notches 37 and 38, respectively. Thus, when the spindle 6 is rotated, the shoulders 40 and 41 engaging in the notches 37 and 38 impart rotation to the wheel, there being sufficient radial and circumferential play between the rings and the web 21 to permit of relative movement of the hub and wheel upon the pneumatic casing.

Upon reference to Fig. 6 it will be seen that the annular helical spring 42 is substituted for the pneumatic casing 23, and with this exception the details of construction of the wheel shown in this figure are identical with those of Figs. 1 to 5, inclusive.

From the foregoing it will be seen that there is provided a resilient wheel structure readily affording the required features of resiliency, compactness and durability together with the embodiment of the yieldingly resistant means in a disk wheel now the popular type of wheel for automobiles. It will, of course, be understood that the resilient hub structure may be readily adapted to a wheel having spokes by ordinary mechanical skill and therefore I do not limit the invention to the adaptation or details of construction shown, but reserve the right to modify same within the spirit of the invention and scope of the claim.

I claim:

In a resilient wheel, in combination, a hub having an annular shoe, an annular housing in which said shoe is disposed, a pneumatic casing on the shoe within said housing, radial walls on said hub for supporting said shoe, said housing having spaced walls engaging said hub walls, said spaced walls having recesses therein, an annular web for said shoe, and said web having a plurality of projections for loose engagement in said recesses.

In testimony whereof I affix my signature in the presence of two witnesses at 36 W. Randolph St., Chicago, Illinois.

HARRY S. HANDLER.

Witnesses:
 DANIEL A. BRENNAN,
 VIRGINIA DURDY.